(12) United States Patent
Qu et al.

(10) Patent No.: US 7,558,673 B1
(45) Date of Patent: Jul. 7, 2009

(54) METHOD AND SYSTEM FOR DETERMINING ATMOSPHERIC PROFILES USING A PHYSICAL RETRIEVAL ALGORITHM

(75) Inventors: Yanni Qu, Fort Wayne, IN (US); William L. Smith, Seaford, VA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 200 days.

(21) Appl. No.: 11/644,721

(22) Filed: Dec. 22, 2006

Related U.S. Application Data

(60) Provisional application No. 60/778,969, filed on Mar. 3, 2006.

(51) Int. Cl.
*G01W 1/00* (2006.01)
(52) U.S. Cl. ................................. 702/3; 702/2; 374/109
(58) Field of Classification Search .................. 702/2–3, 702/15, 196, 8, 134–136, 182–185, 189–190, 702/199
See application file for complete search history.

(56) References Cited

U.S. PATENT DOCUMENTS

| | | | | | |
|---|---|---|---|---|---|
| 2,461,932 | A | * | 2/1949 | Smith | 208/105 |
| 5,075,856 | A | * | 12/1991 | Kneizys et al. | 702/3 |
| 5,315,513 | A | * | 5/1994 | Abreu et al. | 702/3 |
| 5,462,357 | A | * | 10/1995 | Ingram et al. | 374/124 |
| 6,161,075 | A | * | 12/2000 | Cohen | 702/3 |
| 6,484,099 | B1 | * | 11/2002 | Holzer-Popp et al. | 702/2 |
| 6,584,405 | B1 | * | 6/2003 | Moncet | 702/3 |
| 6,714,868 | B2 | * | 3/2004 | Picone et al. | 702/3 |
| 7,467,043 | B1 | * | 12/2008 | Estupinan | 702/3 |
| 2001/0005863 | A1 | * | 6/2001 | Schreier et al. | 709/311 |
| 2003/0188873 | A1 | * | 10/2003 | Anderson et al. | 166/357 |
| 2006/0164063 | A1 | * | 7/2006 | Solheim et al. | 324/76.14 |
| 2007/0240514 | A1 | * | 10/2007 | Irani et al. | 73/596 |

OTHER PUBLICATIONS

Xu Liu et al., "Principal component-based radiative transfer model for hyperspectral sensors: theoretical concept", Applied Optics, Jan. 1, 2006, vol. 45, No. 1, pp. 201-209.

(Continued)

*Primary Examiner*—Eliseo Ramos Feliciano
*Assistant Examiner*—Mi'schita' Henson
(74) *Attorney, Agent, or Firm*—Ratner Prestia

(57) ABSTRACT

The present invention provides a new approach for processing hyper-spectral radiance data. It uses a transformation matrix to convert an instrument radiance spectrum into a pseudo-monochromatic radiance spectrum. The pseudo-monochromatic radiance spectrum is produced by an empirical transform of the instrument channel spectrum to a monochromatic equivalent spectrum (i.e., a pseudo-monochromatic spectrum). Eigenvector regression is used to produce the empirical transformation. Although the transformation does not produce the monochromatic radiance spectrum without error, the transformation error is generally well below nominal instrument noise levels for most spectral channels. The reduction in instrument noise results from a noise filtering effect of the eigenvector transformation. One of the advantages of the present invention is that it eliminates the need to build different fast radiative transfer models (RTMs) for different observing instruments, since the retrieval of geophysical parameters is based on an inversion of the monochromatic radiative transfer model. Although a different transformation matrix is required for different instrument spectral channel characteristics, the production of this transformation matrix is straightforward and simpler than the production of an accurate channel radiance fast model.

15 Claims, 6 Drawing Sheets

OTHER PUBLICATIONS

J. Susskind et al., "An Accurate Radiative Transfer Model for Use in the Direct Physical Inversion of HIRS2 and MSU Temperature Sounding Data", Journal of Geophysical Research, vol. 88, No. C13, Oct. 20, 1983, pp. 8550-8568.

William L. Smith et al., "Hyperspectral Remote Sensing of the Land and Atmosphere", SPIE, vol. 4151, Oct. 2000, pp. 94-102.

Mitchell D. Goldberg et al., "AIRS Near-Real-Time Products and Algorithms in Support of Operational Numerical Weather Predition", IEEE, vol. 41, No. 2, Feb. 2003, pp. 379-389.

L. Larrabee Strow et al., "An Overview of the AIRS Radiative Transfer Model", IEEE, vol. 41, No. 2, Feb. 2003, pp. 303-313.

* cited by examiner

METHOD AND SYSTEM FOR DETERMINING ATMOSPHERIC PROFILES USING A PHYSICAL RETRIEVAL ALGORITHM

CROSS REFERENCE TO RELATED APPLICATIONS

This application claims priority of U.S. Provisional Patent Application Ser. No. 60/778,969, filed Mar. 3, 2006.

TECHNICAL FIELD

The present invention relates, in general, to determining atmospheric profiles using a physical retrieval algorithm. More specifically, the present invention relates to a system and method for using pseudo-monochromatic radiance in a physical retrieval algorithm to determine the atmospheric profiles.

BACKGROUND OF THE INVENTION

Weather prediction is a complicated and complex process. Remote sensing instruments with progressively higher spectral and spatial resolution have been and are still being launched above the earth. These remote sensing instruments include the Atmospheric Infrared sounder (AIRS), the Tropospheric Emission Spectrometer (TES), the Infrared Atmospheric Sounding Interferometer (IASI), and the Geosynchronous Imaging Fourier Transform Spectrometer (GIFTS), etc. These instruments (or sensors, or sounders) provide thousands of channels for receiving spectral radiation from the atmosphere. These instruments provide a wealth of information on atmospheric properties and earth surface properties. In fact, so much information is provided by these instruments that it has become a challenge to analyze the vast amounts of received data.

For improving the accuracy of numerical weather prediction, accurate global observations of atmospheric temperatures and moisture profiles are needed. The satellite and airborne hyper-spectral infrared sensors, mentioned above, have the capability needed to achieve accurate numerical weather prediction.

At least two factors are considered for obtaining accurate atmospheric temperatures and moisture profiles from satellite or airborne observations. One is the accuracy and precision of the sounding spectrometer instrument. Another is the accuracy of the retrieval algorithm and the numerical approach used to process the data.

Retrieval of atmospheric parameters, such as temperature and water vapor profiles, from satellite or airborne infrared sounder systems are based on an atmospheric radiative transfer equation (RTE). The RTE equation is as follows:

$$R_\upsilon(\eta) = \epsilon_\upsilon(\eta) B_\upsilon(Ts) \tau_\upsilon(\eta, 0, p_s) - \int_0^{p_s} B_\upsilon(T(p))(\partial \tau_\upsilon(\eta, 0, p)/\partial p) dp + (1-\epsilon_\upsilon(\eta)) \tau_\upsilon(\eta, 0, p_s) \int_{p_s}^0 B_\upsilon(T(p))(\partial \tau_\upsilon(\eta, p_s, p)/\partial p) dp + \rho_\upsilon(\eta, \theta) \tau_\upsilon(\eta, 0, p_s) \tau_\upsilon(\theta, p_s, 0) F_\upsilon \cos\theta \quad (1)$$

where $R_\upsilon$ is the radiance observed from an instrument at wavenumber $\upsilon$ (cm$^{-1}$);

$\epsilon_\upsilon$ represents the earth surface emissivity at $\upsilon$;

$B_\upsilon(T)$ is the Planck function at absolute temperature T (in Kelvins);

Ts is the earth surface skin temperature;

$T_\upsilon(\eta,p',p)$ describes transmittance along the satellite view angle, $\eta$, of the atmosphere between a pressure level p' and a pressure level p;

$p_s$ indicates the earth surface pressure;

$F_\upsilon$ is the solar irradiance; and $\rho_\upsilon(\eta,\theta)$ and $\tau_\upsilon(\theta,p_s,0)$ are the solar bi-directional surface reflectance and the transmittance of the atmosphere along the solar zenith angle, $\theta$, respectively.

The atmospheric monochromatic transmittance $\tau_\upsilon(\eta,p',p)$ is defined as $$\tau_\upsilon(\eta, p', p) = \exp\left(-1/g \int_{p'}^{p}\left(\sum_i k_i(p, T) q_i(p)\right) \sec(\eta) dp\right), \quad (2)$$

where $k_i(p,T)$ is the absorption coefficient for absorber type i with an absorber mixing ratio $q_i$;

g is gravity;

$k_i$ varies with temperature and pressure; and the atmospheric absorber i may be water vapor, ozone, carbon dioxide, etc.

It will be appreciated that a relationship between the radiance observed from a satellite or an airborne platform and a corresponding earth atmospheric temperature profile, or a corresponding atmospheric absorber profile may be established from equations (1) and (2). Given the atmospheric temperature and absorber mixing ratio at every pressure level p, including the surface temperature and emissivity/reflectivity properties, the monochromatic radiance may be calculated based on equations (1) and (2).

Equations (1) and (2) are strictly valid for monochromatic radiance for which Beer's law holds. Equation (1) is commonly used to interpret radiance observations by defining a spectral channel atmospheric transmittance function, which provides close agreement between the calculation and the observation. Monochromatic radiance, however, cannot be directly observed with a practical instrument. This is because a practical instrument has a radiance response that is not monochromatic and, instead, the instrument has a finite spectral resolution, even though atmospheric species emit (or absorb) radiance monochromatically. Most monochromatic absorption lines in the infrared region are caused by molecular vibration energy level transitions. These monochromatic lines are broadened in the atmosphere by molecular collisions, where the number of collisions depend on the atmospheric temperature and pressure.

The monochromatic RTE given by equation (1) provides an accurate model to determine the relationship between the radiance observed from a satellite or an airborne platform at a monochromatic frequency (wavenumber) and a temperature/pressure profile of the atmosphere. However, any instrument observed radiance has a finite spectral resolution such that the observed radiance is channel radiance rather than monochromatic radiance. Channel radiances may be determined by performing a spectral convolution of the atmospheric monochromatic radiance with an instrument line shape (ILS), or spectral response function, $\phi$, as follows:

$$R_c(v') = \frac{\int_{\Delta v} \varphi(v) R^{mono}(v) dv}{\int_{\Delta v} \varphi(v) dv} \quad (3)$$

where v' is the central wavenumber of the channel radiance.

For small $\Delta v$ the following relationship holds:

$$\tau_c(v') \sim \frac{\int_{\Delta v} \varphi(v) \tau^{mono}(v) dv}{\int_{\Delta v} \varphi(v) dv} \quad (4)$$

Many different channel radiative transfer models (RTMs) have been developed based on the monochromatic RTM. A recent detailed summary of channel RTMs is provided by Xu Liu et al., "Principal Component-Based Radiative Transfer Model for Hyperspectral Sensors: Theoretical Concept", Applied Optics, Jan. 1, 2006, Vol. 45, No. 1, pps. 201-209. This summary is incorporated herein by reference.

Monochromatic RTMs use analytical formulae to simulate absorption line shape variation with temperature and pressure. More than 35 species with over 1,700,000 spectral lines have been measured for applications to the earth's atmosphere. Simulation of all monochromatic lines is very time consuming especially because one must account for all the different absorption lines that can affect any given frequency as a result of pressure broadening.

Spectral convolution of the monochromatic radiance spectrum using the instrument spectral response function produces an estimate of the observed radiance spectrum. This is called the forward problem, and it is well defined. Retrieval of atmospheric parameters from the observed radiance spectrum is called the inverse problem. The inverse problem is ill conditioned in the sense that many solutions may be obtained from one set of radiance observations. Statistical relationships between the atmospheric parameters and the spectral radiance measurements are commonly produced through radiative transfer simulation to provide a statistical constraint for obtaining an acceptable solution.

SUMMARY OF THE INVENTION

To meet this and other needs, and in view of its purposes, the present invention provides a method for determining atmospheric profiles using a physical retrieval algorithm. The method includes the steps of: (a) applying atmospheric data to a monochromatic radiative transfer model to obtain a monochromatic atmospheric radiance; (b) applying the monochromatic atmospheric radiance obtained in step (a) to the physical retrieval algorithm; (c) transforming instrument observed channel radiance into pseudo-monochromatic radiance; (d) applying the pseudo-monochromatic radiance obtained in step (c) to the physical retrieval algorithm; and (e) determining the atmospheric profiles using the physical retrieval algorithm.

In an embodiment of the invention, step (c) of the above method includes the following: (i) determining principal components (also referred to herein as eigen vectors) of the instrument observed channel radiance, (ii) determining principal components of the monochromatic atmospheric radiance, (iii) calculating a transformation matrix based on steps (i) and (ii), and (iv) transforming instrument observed channel radiance into pseudo-monochromatic radiance using the transformation matrix calculated in step (iii).

In an embodiment of the invention, step (i) includes performing eigen vector analysis on the instrument observed channel radiance as:

$R_c = E_c C_c$ where $R_c$ is the instrument observed channel radiance, $E_c$ is a matrix of eigen vectors, and $C_c$ is a matrix of eigen vector amplitudes (score) for the observed channel radiance.

Furthermore, step (ii) includes performing eigen vector analysis on the monochromatic atmospheric radiance as:

$R_\upsilon = E_\upsilon C_\upsilon$ where $R_\upsilon$ is the monochromatic atmospheric radiance, $E_\upsilon$ is a matrix of eigen vectors, and $C_\upsilon$ is a matrix of eigen vector amplitudes (score) for the monochromatic atmospheric radiance.

Lastly, step (iii) includes calculating values of a transformation matrix, B, as:

$C_\upsilon = B C_c$, and $B = C_\upsilon C_c^T (C_c C_c^T)^{-1}$.

Another embodiment of the present invention is a system for determining atmospheric profiles. The system includes a physical retrieval algorithm for obtaining atmospheric profiles, and a monochromatic radiative transfer model for obtaining monochromatic atmospheric radiance. A first input module applies the monochromatic atmospheric radiance to the physical retrieval algorithm. A transformation module transforms instrument observed channel radiance into pseudo-monochromatic radiance, and a second input module applies the pseudo-monochromatic radiance to the physical retrieval algorithm. The atmospheric profiles are determined by the physical retrieval algorithm using the applied monochromatic atmospheric radiance and the pseudo-monochromatic radiance.

The transformation module includes a first analysis module for determining principal components of the instrument observed channel radiance, a second analysis module for determining principal components of the monochromatic atmospheric radiance, and a transformation matrix calculated from the principal components determined by the first and second analysis modules. The transformation matrix is used to transform instrument observed channel radiance into pseudo-monochromatic radiance.

The first analysis module performs eigen vector analysis on the instrument observed channel radiance using the following equation:

$R_c = E_c C_c$ where $R_c$ is the instrument observed channel radiance, $E_c$ is a matrix of eigen vectors, and $C_c$ is a matrix of eigen vector amplitudes for the observed channel radiance.

The second analysis module performs eigen vector analysis on the monochromatic atmospheric radiance using the following equation:

$R_\upsilon = E_\upsilon C_\upsilon$ where $R_\upsilon$ is the monochromatic atmospheric radiance, $E_\upsilon$ is a matrix of eigen vectors, and $C_\upsilon$ is a matrix of eigen vector amplitudes for the monochromatic atmospheric radiance.

The transformation matrix, B, is calculated using the following equation:

$$C_v = BC_c, \text{ and}$$

$$B = C_v C_e^T (C_e C_e^T)^{-1}.$$

It is understood that the foregoing general description and the following detailed description are exemplary, but are not restrictive, of the invention.

BRIEF DESCRIPTION OF THE DRAWING

The invention is best understood from the following detailed description when read in connection with the accompanying drawing. Included in the drawing are the following figures.

DETAILED DESCRIPTION OF THE INVENTION

Figure 1:
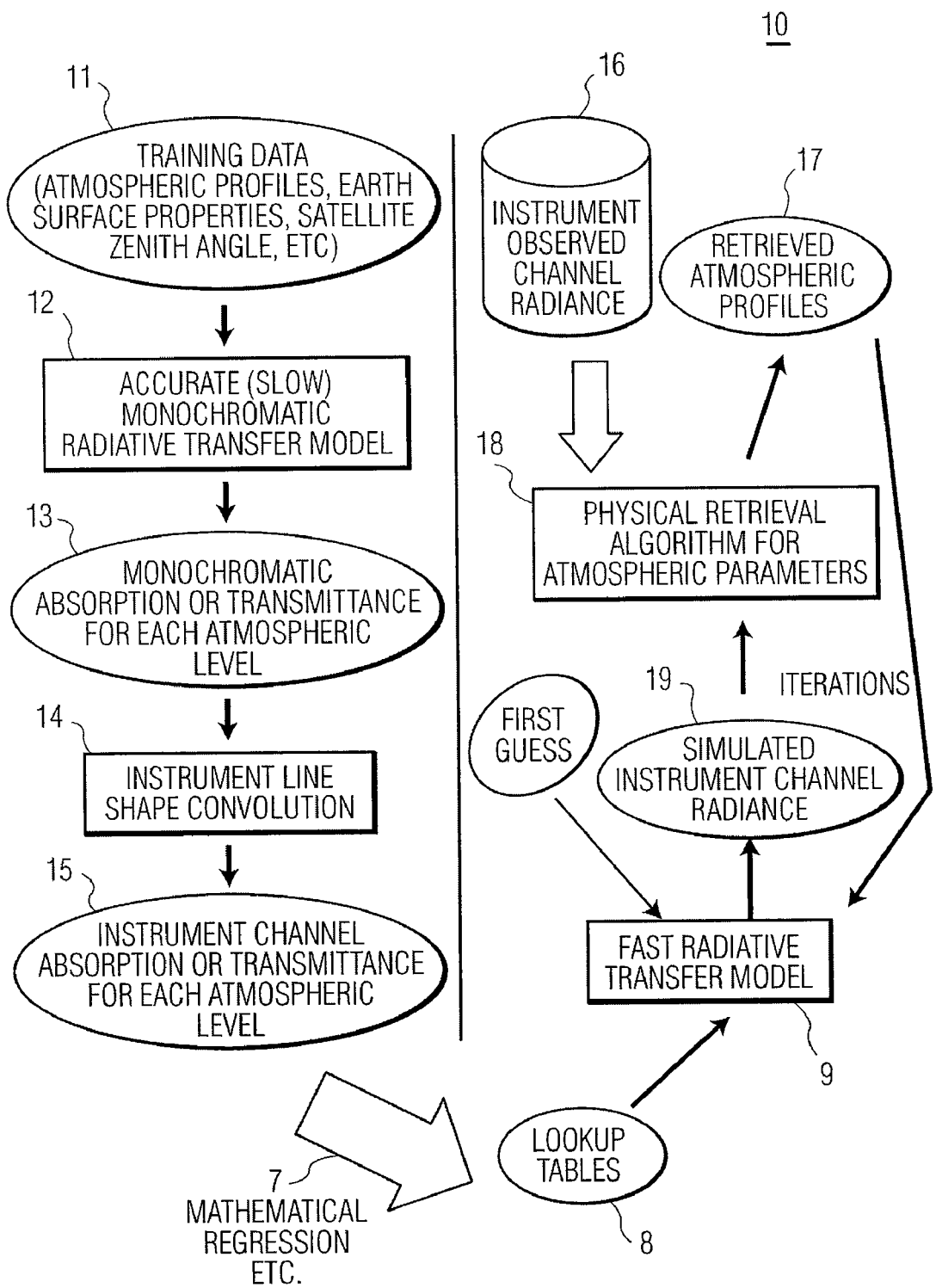
FIG. 1 is a functional block diagram of a method for developing an instrument channel radiative transfer model (RTM) which may be used for atmospheric profile retrieval.

Studies have shown that reducing the instrument noise and increasing the spectral resolution increases the quality of the retrieved atmospheric profiles. A new generation of infrared sounders provides much higher spectral resolution with relatively low noise levels as a result of new technology development. However, the remote sounding spectrometer has a finite spectral resolution and measurement noise. A compensatory way to filter instrument noise and approximate 'infinite' spectral resolution is to perform an empirical transformation of the observed spectrum to a monochromatic radiance spectrum (i.e., a pseudo-monochromatic measurement spectrum). This empirical transformation enables the rapid extraction of atmospheric profile information using a monochromatic forward radiative transfer model.

The present invention provides a new approach to the retrieval of atmospheric temperature, moisture, and trace gas profiles from satellite or airborne infrared sounder observations. Observed spectra of channel radiance are based on the known instrument line shape (ILS) characteristics. A transformation function is derived from simulated monochromatic radiance and corresponding instrument channel radiance simulated from a large global sample of atmospheric profiles for representative surface and cloud conditions. The large global sample (for example) includes cloud-free atmospheric conditions and more than 2500 radiosonde measurements. Line by line (LBL) monochromatic radiance is calculated using a LBLRTM. Channel radiances are simulated from these monochromatic radiances with an appropriate ILS function. The present invention uses the following steps to determine the transformation matrix:

1. Calculate noise-free monochromatic radiance spectra.
2. Use a particular instrument ILS function to convolve line-by-line (LBL) radiance into channel radiance, without instrument noise.
3. Perform eigenvector analysis of the error free monochromatic radiance to extract the independent pieces of information (i.e., the eigenvector amplitudes) contained in monochromatic radiance spectra.
4. Perform eigenvector analysis of the error free instrument channel radiance in order to extract most significant independent pieces of information (i.e., the eigenvector amplitudes) contained in channel radiance spectra.
5. Determine the minimum number of eigenvectors required to fit the channel radiance spectra to within the instrument noise level.
6. Use multiple linear regression to compute a regression matrix, which may be used to predict the monochromatic radiance eigenvector amplitudes from the instrument channel radiance eigenvector amplitudes. The regression coefficient matrix is then used to transform instrument channel radiance measurement spectra into pseudo-monochromatic radiance spectra for the profile retrieval.

Once the regression transformation matrix is determined, it may be applied to any observed channel radiance spectra to obtain pseudo-monochromatic radiance spectra for the particular instrument. The transformation matrix and associated eigenvector representation serves two purposes: (1) to convert channel radiance into pseudo-monochromatic radiance, and (2) to filter instrument noise. Therefore, using theoretical simulations of monochromatic and instrument channel radiances to generate the transformation matrix, measurement spectral resolution is enhanced and instrument random noise is reduced. One advantage of the present invention is that a common monochromatic RTM is used for different instruments (e.g., AIRS, IASI, TES, GIFTS, etc.) because the observed radiance spectrum is transformed to monochromatic radiance on a common spectral scale.

FIG. 1 provides an approach for the retrieval of atmospheric profiles. Offline work focuses on building a fast radiative transfer model (RTM) for the computation of channel radiance for a particular instrument. This fast RTM is then used in a retrieval algorithm to evaluate the difference between observed channel radiance and simulated channel radiance from a guess profile. The instrument channel radiance RTM is based on regression training with atmospheric parameters, with results used in a large look up table for each atmospheric species. These lookup tables are a core part of the fast RTM used in retrieval algorithms.

Referring to FIG. 1, method 10 obtains retrieved atmospheric profiles, designated as 17, by first building a fast radiative transfer model (RTM), designated as 9. Since method 10 is mathematically very intensive, the building of the fast RTM is done off-line. Using training data (including atmospheric profiles and earth surface properties) and an accurate (slow) monochromatic RTM, method 10 obtains monochromatic absorption and transmittance (radiance) for each atmospheric level. In FIG. 1, the training data is designated by 11, the monochromatic RTM is designated by 12, and the monochromatic absorption and transmittance (radiance) for each atmospheric level is designated by 13.

It will be appreciated that monochromatic absorption or transmittance for each atmospheric level is a delta response of the monochromatic RTM to the training data. The monochromatic absorption or transmittance (radiance) may be calculated using Equations (1) and (2) described earlier. The monochromatic radiance, however, cannot be directly observed using a practical instrument. This is so, because a practical instrument has a radiance response that is not monochromatic and, instead, has a finite spectral resolution. On the other hand, the monochromatic RTM 12 provides an accurate model to determine the theoretical relationship between the radiance observed from a satellite or airborne platform and the temperature/pressure profile of the atmosphere at a monochromatic frequency (wave number).

Since the observed radiance of an instrument has a finite spectral resolution, the observed radiance becomes channel radiance and is not monochromatic radiance. Method 10 obtains the instrument channel radiance (or channel absorption and transmittance for each atmospheric level), designated 15, by performing an instrument line shape (ILS) convolution (designated 14 in FIG. 1). The convolution of the monochromatic radiance with the ILS is provided by Equation (3), described earlier. Using mathematical regression 7 and results of large look-up tables 8 for the different atmospheric species, the method builds a fast radiative transfer model (RTM) 9. This fast RTM is an approximation of a radiative transfer equation for the instrument channel under consideration. As shown in FIG. 1, the fast RTM 9 is subject to refinement by method 10 using iterative changes to previous estimations of the RTM. Using the fast RTM 9, simulated instrument channel radiance (designated as 19) is obtained by method 10.

It will be appreciated that fast monochromatic RTM and slow (accurate) monochromatic RTM use the same radiative equation to calculate atmospheric radiance. A difference, however, is that the slow RTM needs to calculate all absorption lines in a desired spectral band and channel, whereas the fast RTM only needs to calculate a small portion of the absorption lines. Accordingly, only absorption lines located in the center of an instrument channel frequency is calculated. The other absorption lines are ignored.

For example, there are 100-200 channels in a 9.6 um ozone band for a typical instrument. The fast RTM only calculates 100-200 absorption lines, where each monochromatic absorption line is at the center frequency of a channel. All other absorption contributions are assumed to be zero. In the slow monochromatic RTM, however, there are over 10,000 absorption lines that are calculated.

Next, method 10 compares simulated instrument channel radiance 19 with observed instrument channel radiance 16 using a physical retrieval algorithm, such as algorithm 18. The output of physical retrieval algorithm 18 is the retrieved atmospheric profiles (designated as 17).

The retrieved atmospheric profiles 17 may be fed back into a modified fast RTM 9 to obtain another iteration of simulated instrument channel radiance 19. Several iterations may be performed, until simulated instrument channel radiance 19 closely matches observed instrument channel radiance 16, as they are fed into physical retrieval algorithm 18. After several iterations, a final physical retrieval algorithm 18 is obtained and the retrieved atmospheric profiles, designated as 17, may be outputted to the end user. To obtain the end product, the instrument observed channel radiance 16 is fed into the physical retrieval algorithm 18 to obtain the atmospheric profiles 17.

Figure 2:
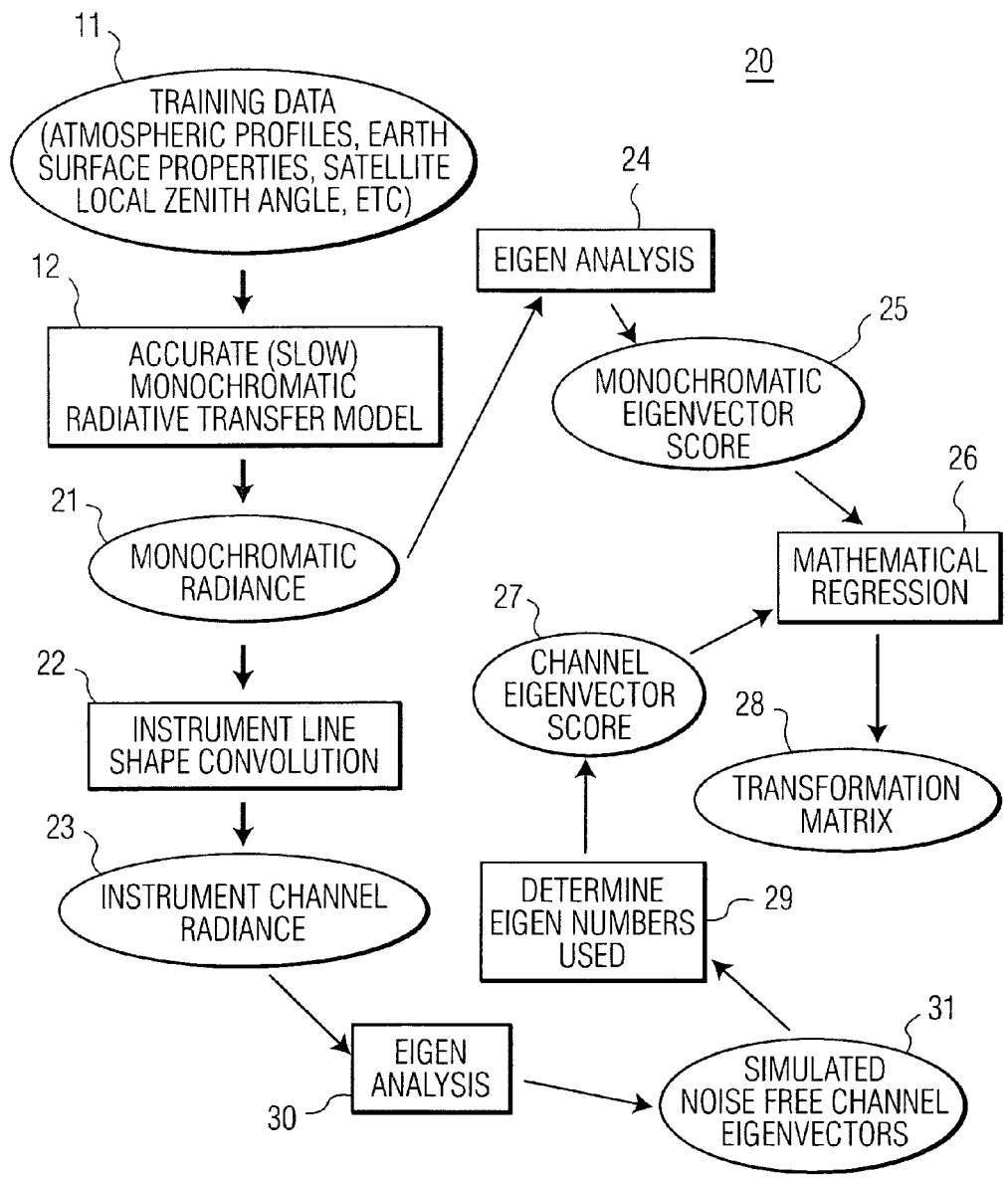
FIG. 2 is a functional block diagram of a method for deriving a transformation matrix using simulated radiance data, in accordance with an embodiment of the present invention.
Figure 3:
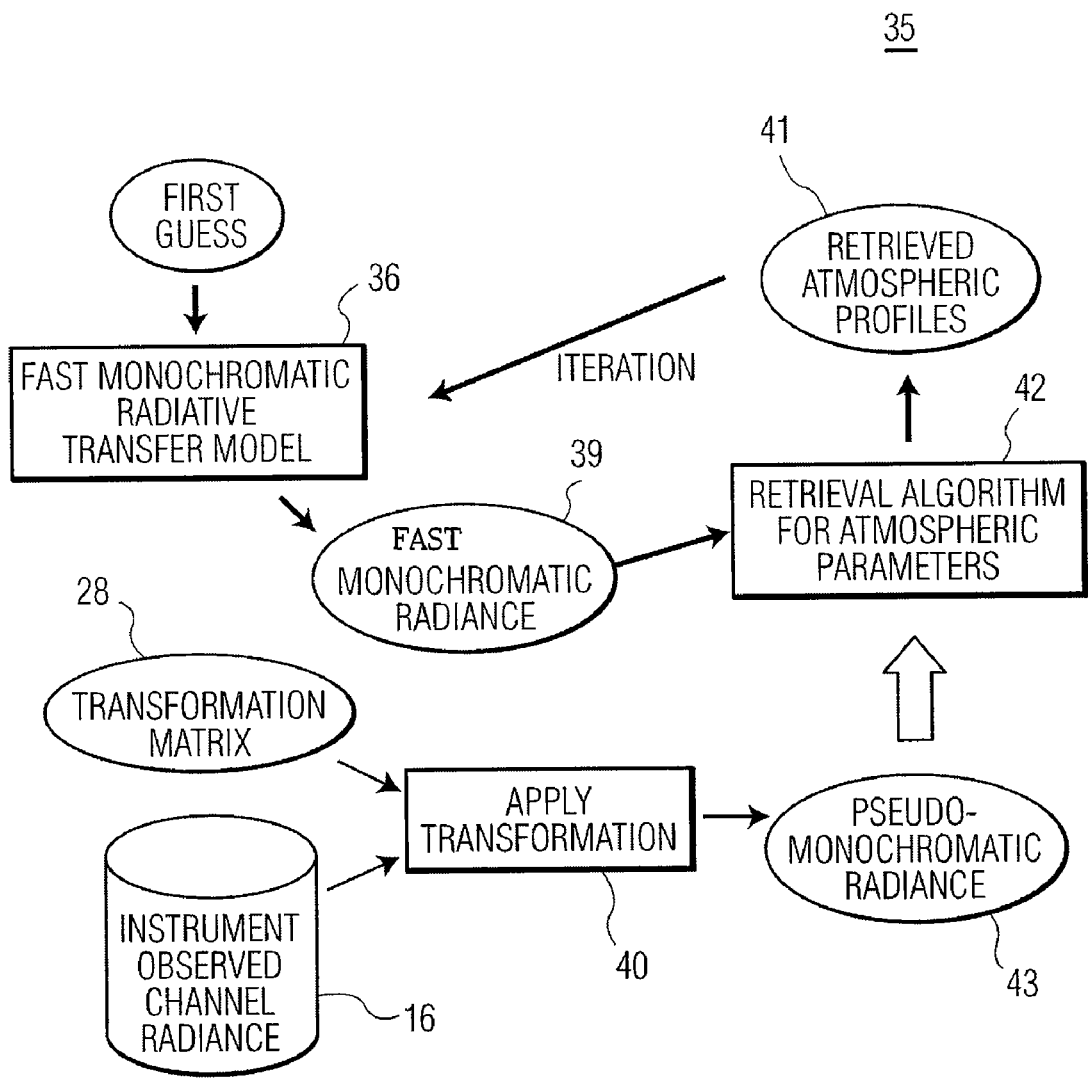
FIG. 3 is a functional block diagram of a method for using the transformation matrix of FIG. 2 with a fast monochromatic RTM for atmospheric profile retrieval, in accordance with an embodiment of the present invention.

FIGS. 2 and 3 show a monochromatic approach to retrieve atmospheric profiles from observed radiance spectra in accordance with an embodiment of the present invention. FIG. 2 shows derivation of a transformation matrix between channel radiance and monochromatic radiance. This is offline work, which is performed once for a particular instrument ILS. FIG. 3 shows the monochromatic approach for the retrieval of atmospheric profiles.

Referring first to FIG. 2, method 20 derives transformation matrix 28 between channel radiance and monochromatic radiance. Obtaining transformation matrix 28 is performed offline only once for a particular instrument. Accordingly, using training data 11 and an accurate monochromatic RTM 12, method 20 obtains monochromatic radiance 21. Similar to method 10, method 20 uses convolution 22 to derive instrument channel radiance (designated as 23). It will be appreciated that steps 11, 12, 21, 22 and 23, which are shown in FIG. 2, are similar to the offline work performed in steps 11, 12, 13, 14 and 15, which are shown in FIG. 1.

Referring to FIG. 2, Eigenvector analysis 30 is performed on instrument channel radiance 23 and Eigenvector analysis 24 is performed on monochromatic radiance, using Equations (5) and (6) described later. Obtaining simulated noise-free channel Eigenvectors (designated as 31), method 20 extracts the most significant independent pieces of information (i.e., the Eigenvector amplitudes) in step 29 and determines the minimum number of Eigenvectors required in order to obtain channel Eigenvector score 27. Once the Eigenvectors are calculated, these Eigenvectors remain fixed for a given instrument. Generally, 1 to 200 Eigenvectors are needed to reconstruct any particular observed radiance spectra with good accuracy.

After performing Eigenvector analysis 24 on the error free monochromatic radiance 21, the method extracts the independent pieces of information (i.e., the Eigenvector amplitudes) contained in the monochromatic radiance spectra. The monochromatic Eigenvector score 25 is thus obtained. Using mathematical regression 26, a transformation matrix 28 is derived. The transformation matrix is shown in Equation (8), described later.

Once transformation matrix 28 is generated, it may be applied to any observed channel radiance spectra to obtain pseudo-monochromatic radiance spectra for the particular instrument. Referring to FIG. 3, a fast (approximate) monochromatic radiative transfer model (RTM) 36 is used, which is limited to the delta response of a theoretical instrument. Using this fast monochromatic RTM, simulated monochromatic radiance 39 is obtained, which is then fed into retrieval algorithm 42 to obtain atmospheric profiles 41. The fast RTM 36, as well as retrieval algorithm 42, may be modified through several iterations, as shown in FIG. 3.

Shown as a separate path in FIG. 3, pseudo-monochromatic radiance 43 is also fed into retrieval algorithm 42 to obtain the atmospheric profiles. The transformation matrix 28, obtained by method 20, is applied to the observed instrument channel radiance 16, by way of step 40, to obtain the pseudo-monochromatic radiance 43. The pseudo-monochromatic radiance is compared to the simulated monochromatic radiance in retrieval algorithm 42 by examining the results of the retrieved atmospheric profiles. The retrieved atmospheric profiles are used to modify the fast RTM and the retrieval algorithm. This process is repeated until the pseudo-monochromatic radiance closely matches the simulated monochromatic radiance. Once a close match is obtained, method 35 provides the atmospheric profiles as an output to the end user.

Figure 4:
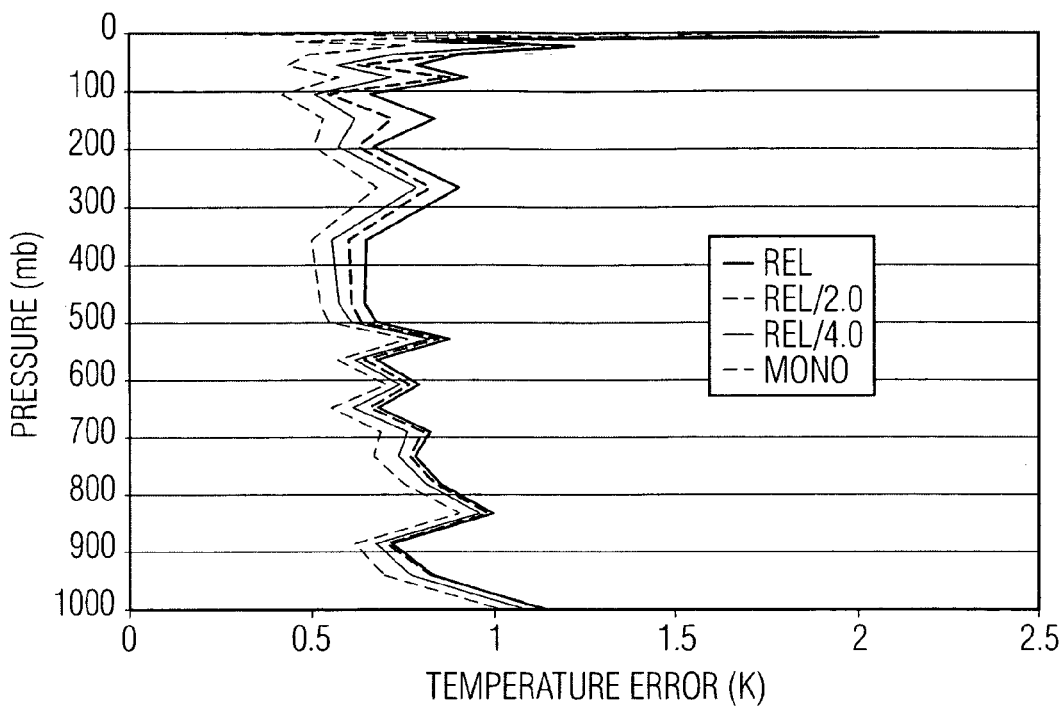
FIG. 4 shows plots of retrieval temperature RMS errors using radiances simulated at different spectral resolutions, where the label "rel" corresponds to nominal instrument spectral resolution, the labels "rel/2" and "rel/4" correspond to results obtained from 2 times and 4 times higher than nominal instrument spectral resolution, and the label "mono" indicates the result from simulated monochromatic radiance at a central channel wave number.
Figure 5:
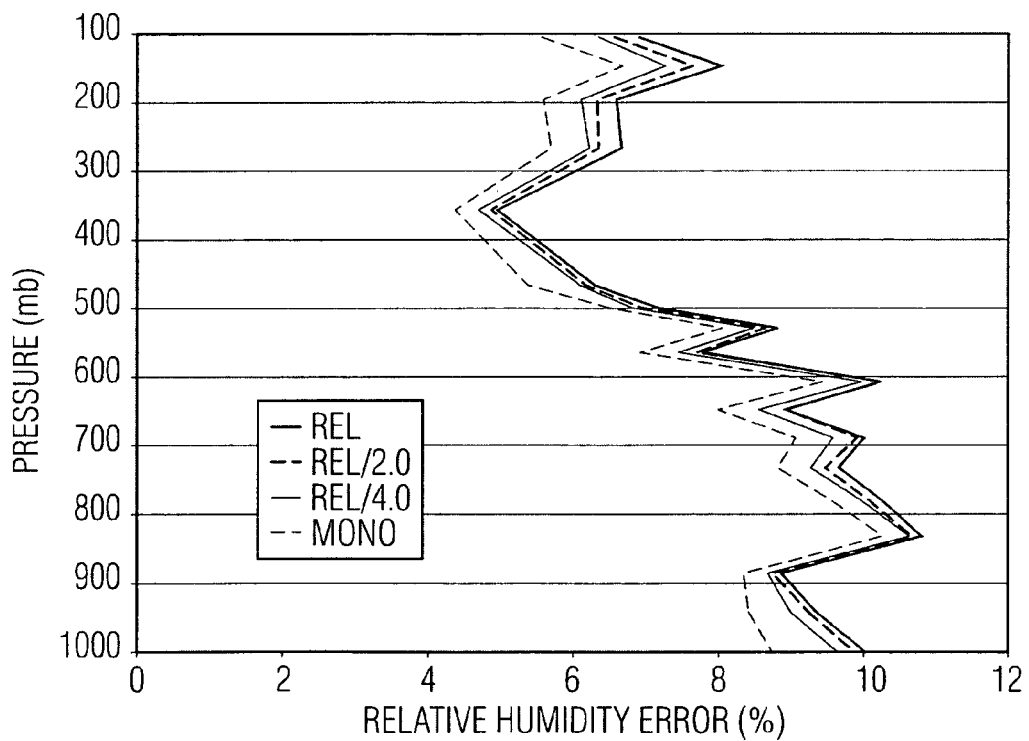
FIG. 5 depicts plots of retrieval moisture RMS errors using different spectral resolutions, with labels defined similarly to the labels shown in FIG. 4.

It will be appreciated that the radiance along an absorption line of any species has a magnitude dependent upon the spectral position relative to line center, the line strength, and the pressure and temperature of the molecule. Radiances from strong absorption line centers arise from the upper atmosphere, whereas radiances from the far wing of an absorption line, or near the center of a weak absorption line, arise from the lower atmosphere. With low instrument spectral resolution, the line structure of the radiance and, consequently, the vertical resolution of the measurement is typically smeared. FIGS. 4 and 5 show the RMS errors of temperature and moisture profiles for different instrument spectral resolutions. A typical instrument spectral resolution and coverage are assumed to be the nominal instrument measurement conditions. The noise is the same for all cases with 0.2° K NEDT at 250° K across a whole spectral region from 650-2550 $cm^{-1}$. As may be seen, although a typical instrument employs a spectral resolution able to resolve the spacing in-between individual absorption lines, the error in the retrieval becomes smaller when observing at a higher spectral resolution. If using monochromatic spectral radiance, the RMS error of the lowest layer temperature retrieval is reduced from 1.13° K for a typical instrument nominal observing condition to 1.01° K, for the monochromatic measurement condition, an improvement of about 10%. The moisture profile error is in percentage of relative humidity. The RMS error is improved from 10.0 to 8.7 between a typical instrument spectral resolution and the monochromatic radiance resolution near the earth's surface. Thus, minimizing the smearing of the spectral structure optimizes the atmospheric vertical resolution, thereby yielding more accurate profile results.

FIG. 4 shows the retrieval temperature RMS errors for different spectral resolutions. The curve labeled "rel" corresponds to a typical instrument spectral resolution, whereas "rel/2" and "rel/4" refer to results obtained for two times and four times higher resolution than a typical instrument spectral resolution. "Mono" indicates the result from simulated monochromatic radiance.

FIG. 5 shows the retrieval moisture RMS errors for different spectral resolutions. The labels on the curves have the same meaning as the labels on the curves of FIG. 4.

According to the present invention, pseudo-monochromatic radiance is derived from instrument channel radiance using an empirically determined transformation matrix. The transformation matrix is derived from simulated channel radiance and monochromatic radiance from the LBLRTM for over 2500 atmospheric profiles. Eigenvector analysis is performed on channel radiance $R_c$ and monochromatic radiance $R_\upsilon$, according to the following relationship:

$$R_c = E_c C_c \quad (5)$$

$$R_\upsilon = E_\upsilon C_\upsilon \quad (6)$$

Here $E_c$ and $E_\upsilon$ are eigenvectors for channel radiance and monochromatic radiance, respectively. $C_c$ is a matrix of eigenvector amplitudes for channel radiance and $C_\upsilon$ is a matrix of eigenvector amplitudes for monochromatic radiances. In general, eigenvectors capture the spectral variation of radiance, the spectral structure being dependent on the number of eigenvectors resolved above the instrument noise level. Once the eigenvectors are calculated, they remain fixed for a given instrument. Generally, one to two hundred eigenvectors, determined from a global sample of atmospheric conditions, are needed to re-construct any particular measured radiance spectrum with good accuracy. The eigenvector amplitudes account for the dependence of the measured radiance spectrum on the particular atmospheric and surface properties being observed. In equations (5) and (6) above, $R_c$ and $R_\upsilon$, are simulated from the same atmospheric profiles. Thus, $C_c$ and $C_\upsilon$ include the same atmospheric and surface state information. The $C_\upsilon$ may be specified from $C_c$ using the following transformation matrix:

$$C_\upsilon = BC_c. \quad (7)$$

The transformation matrix, B, may be specified using multiple linear regression, as follows:

$$B = C_\upsilon C_c^T (C_c C_c^T)^{-1} \quad (8)$$

Once B is generated, any monochromatic radiance spectrum may be derived using equations (7) and (6). Since the monochromatic radiance is not directly observed, we call it pseudo-monochromatic radiance. There is an error associated with its estimation. However, this error of estimation is smaller than the errors associated with fast forward models, and this procedure simplifies any procedure for the retrieval of atmospheric profiles from instrument channel radiance spectra. With the present invention there is no longer any need to develop a fast forward model for different sounding spectrometer instruments (i.e., the same monochromatic radiative transfer model may be used for all instruments). Although a different transformation matrix must be estimated for each instrument, this is a much simpler process than the process required for accurate fast forward model development.

The transformation matrix includes statistical characteristics of the training data set. Consequently, the more representative is the training sample, the more accurate the estimation process is for a given number of eigenvectors. For the invention exemplified herein, diverse global samples of clear sky atmospheric and surface conditions are assumed. It is recognized, however, that in any practical application the statistical training data set should preferably include a wide range of cloud conditions as well.

Figure 6:
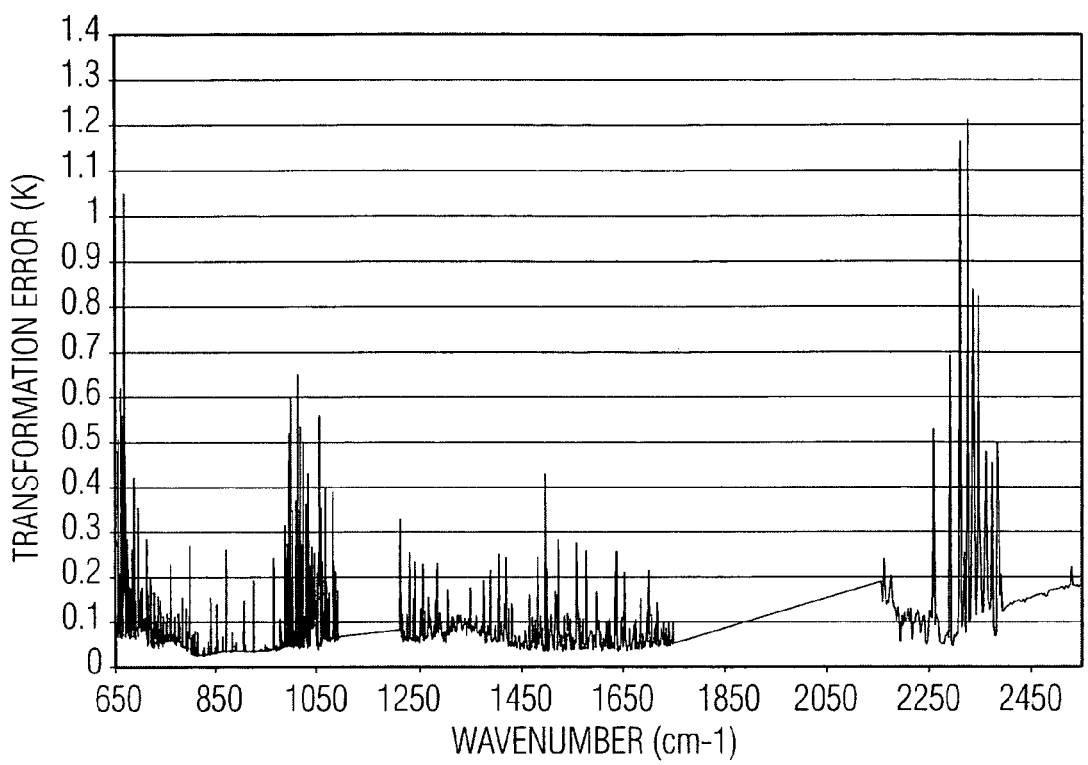
FIG. 6 shows a plot of RMS error of pseudo-monochromatic radiance transformation in brightness-temperature (BT) units.

FIG. 6 depicts the RMS error of pseudo-monochromatic radiance, produced from a typical instrument channel radiance spectra, using the regression transformation determination of the present invention. The error is shown in terms of brightness temperature error relative to a typical instrument noise level at 0.2° K. The error is smaller than instrument noise (i.e., 0.2° K) for 90% of the spectral channels, with the largest errors occurring near the centers of 4.3 μm and 15 μm $CO_2$ bands, and 9.6 μm $O_3$ band.

The RMS error of pseudo-monochromatic radiance transformation shown in FIG. 6 is in BT units. An error of 0.2° K denotes an error equal to the instrument noise.

Figure 7:
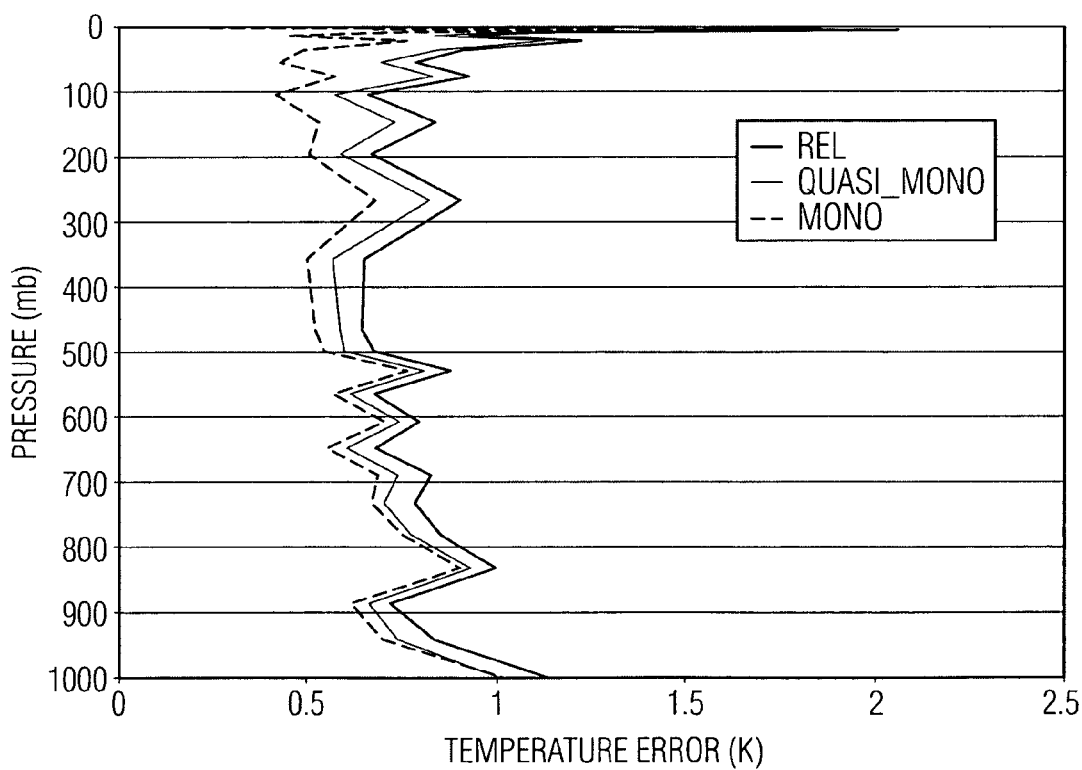
FIG. 7 depicts plots of temperature errors for retrievals using pseudo-monochromatic radiance spectra.
Figure 8:
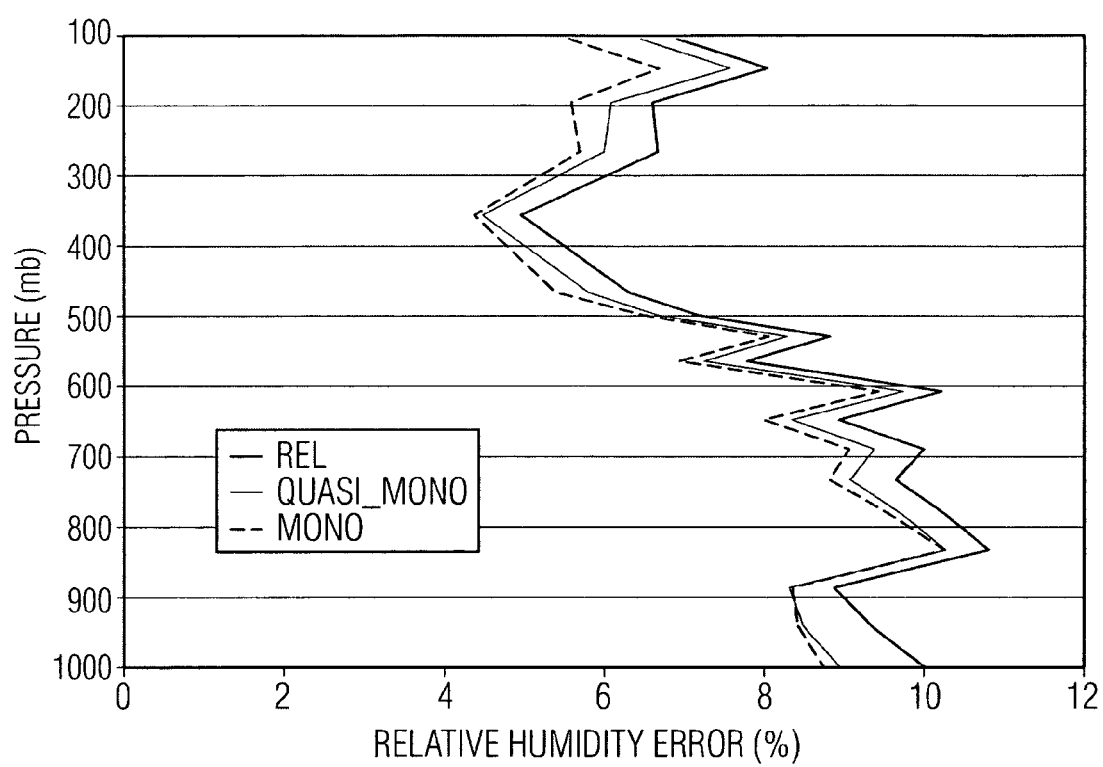
FIG. 8 depicts plots of moisture errors for retrievals using pseudo-monochromatic radiance spectra.

The errors of the retrieved atmospheric temperature and moisture profiles from pseudo-monochromatic radiance are provided in FIG. 7 and FIG. 8. The errors are significantly smaller than the original instrument channel radiance retrieval results, but are worse than the result provided by pure theoretical monochromatic radiance spectra because of the transformation error. For temperature, the lowest atmospheric retrieval errors associated with the pseudo-monochromatic radiance are similar to those obtained from pure simulated monochromatic radiance spectra. Even in the upper atmosphere, temperature profile errors from pseudo-monochromatic radiance are at least 10% better than those achieved using instrument channel radiance spectra. Moisture retrieval errors associated with pseudo-monochromatic radiance spectra are similar to those associated with simulated pure monochromatic radiance spectra, particularly for the lower atmosphere.

In summary the present invention provides a new approach to the retrieval of atmospheric temperature and moisture profiles from satellite or airborne hyper-spectral radiance spectra. The invention includes using a pseudo-monochromatic radiance spectrum, estimated from instrument channel spectrum, as the profile predictor. The pseudo-monochromatic radiance spectra are produced by a transformation from channel radiance spectra, by performing an empirical radiance spectrum de-convolution. A least square regression between eigenvector amplitudes of channel radiance and monochromatic radiance is used to provide the desired transformation. Noise in observed channel radiance spectra are filtered through the eigenvector transformation approach. Although there is an error of estimation in radiance transformation, the error is smaller than that associated with fast forward model representations of channel radiance spectra. One of the advantages of the pseudo-monochromatic radiance approach is that an instrument independent monochromatic radiative transfer model is used for profile retrieval. The present invention, thus, simplifies the application of satellite or airborne observed hyper-spectral sounding radiance spectra for the weather analysis/prediction operation.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A method for determining atmospheric profiles using a physical retrieval algorithm, the method comprising the steps of:
   (a) building a fast monochromatic radiative transfer model (RTM), wherein the fast monochromatic RTM is limited to a response of a theoretical instrument;
   (b) applying atmospheric data to the fast monochromatic RTM to obtain fast monochromatic atmospheric radiance;
   (c) converting directly observed instrument channel radiance into a pseudo monochromatic radiance by
      (i) determining principal component amplitudes of the directly observed instrument channel radiance, and
      (ii) transforming the principal component amplitudes determined in step (i) into pseudo-monochromatic radiance by applying a transformation matrix;
   (d) applying the pseudo-monochromatic radiance obtained in step (c) and the fast monochromatic radiance obtained in step (b) to the physical retrieval algorithm; and
   (e) determining the atmospheric profiles using the physical retrieval algorithm in response to step (d).

2. The method of claim 1 including
generating offline the transformation matrix by applying training data to a slow monochromatic RTM.

3. The method of claim 2 wherein generating offline the transformation matrix includes
performing eigen vector analysis on simulated instrument channel radiance as:

$R_c = E_c C_c$ where
$R_c$ is the simulated instrument channel radiance,
$E_c$ is a matrix of eigen vectors, and
$C_c$ is a matrix of eigen vector amplitudes for the simulated instrument channel radiance, and
performing eigen vector analysis on the fast monochromatic atmospheric radiance as:

$R_\upsilon = E_\upsilon C\upsilon$ where
$R_\upsilon$ is the fast monochromatic atmospheric radiance,
$E_\upsilon$ is a matrix of eigen vectors, and
$C_\upsilon$ is a matrix of eigen vector amplitudes for the fast monochromatic atmospheric radiance, and
calculating values of the transformation matrix, B, as:

$C_\upsilon = BC_c$, and $B = C_\upsilon C_c^T (C_c C_c^T)^{-1}$.

4. The method of claim 1 wherein step (a) includes
applying at least atmospheric profiles and earth surface properties to the fast monochromatic RTM.

5. The method of claim 1 further including the steps of:
updating the fast monochromatic atmospheric radiance based on the atmospheric profiles determined in step (e), and
repeating steps (a)-(e) using the updated fast monochromatic atmospheric radiance.

6. The method of claim 1 wherein
step (b) includes applying the fast monochromatic RTM to obtain the fast monochromatic atmospheric radiance independently of an instrument type, and
step (c) includes transforming the directly observed instrument channel radiance into the pseudo-monochromatic radiance dependently on the instrument type.

7. The method of claim 6 wherein
step (c) includes transforming the directly observed instrument channel radiance into the pseudo-monochromatic radiance based on the instrument type of an infrared hyper-spectral sounder on a satellite or an airborne platform.

8. A system for determining atmospheric profiles comprising:
a physical retrieval algorithm for obtaining atmospheric profiles,
a fast monochromatic radiative transfer model (RTM) for obtaining fast monochromatic atmospheric radiance, wherein the fast monochromatic RTM is limited to a response of a theoretical instrument,
a first input module for applying the fast monochromatic atmospheric radiance to the physical retrieval algorithm,
a transformation module for transforming directly observed instrument channel radiance into pseudo-monochromatic radiance, and
a second input module for applying the pseudo-monochromatic radiance to the physical retrieval algorithm,
wherein the atmospheric profiles are determined by the physical retrieval algorithm using the applied fast monochromatic atmospheric radiance and the pseudo-monochromatic radiance.

9. The system of claim 8 wherein the transformation module includes
an analysis module for determining principal component amplitudes of the directly observed instrument channel radiance, and
a storage device for storing a transformation matrix calculated offline,
wherein the transformation matrix is used to transform the directly observed instrument channel radiance into the pseudo-monochromatic radiance.

10. The method of claim 9 wherein
the analysis module performs offline eigen vector analysis on simulated instrument channel radiance using the following equation:

$R_c = E_c C_c$ where $R_c$ is the simulated instrument channel radiance, $E_c$ is a matrix of eigen vectors, and $C_c$ is a matrix of eigen vector amplitudes for the simulated instrument channel radiance, another analysis module performs eigen vector analysis on the fast monochromatic atmospheric radiance using the following equation:

$$R_\upsilon = E_\upsilon C_\upsilon$$

where $R_\upsilon$ is the fast monochromatic atmospheric radiance, $E_\upsilon$ is a matrix of eigen vectors, and $C_\upsilon$ is a matrix of eigen vector amplitudes for the fast monochromatic atmospheric radiance, and the transformation matrix, B, is calculated offline using the following equation:

$$C_\upsilon = BC_c, \text{ and}$$

$$B = C_\upsilon C_c^T (C_c C_c^T)^{-1}.$$

11. The system of claim 8 wherein
atmospheric data including at least atmospheric profiles and earth surface properties are applied as input values to the fast monochromatic RTM.

12. The system of claim 8 further including the steps of:
the fast monochromatic radiance is configured to be iteratively modified based on the atmospheric profiles determined by the physical retrieval algorithm.

13. The system of claim 8 wherein
the physical retrieval algorithm is provided input values of observed radiance and simulated radiance, and
the observed radiance is the pseudo-monochromatic radiance, and
the simulated radiance is the fast monochromatic atmospheric radiance.

14. The system of claim 13 wherein
one fast monochromatic RTM is used to obtain the fast monochromatic atmospheric radiance independently of an instrument type, and
the instrument observed channel radiance is obtained dependently on the instrument type.

15. The system of claim 14 wherein
the instrument type includes a hyper-spectral sounder on a satellite or an airborne platform.

\* \* \* \* \*